United States Patent [19]

Grim

[11] 4,288,215

[45] Sep. 8, 1981

[54] METHOD AND APPARATUS FOR PREHEATING A ROTATABLE FLUIDIZABLE BED

[75] Inventor: George B. Grim, Washington, Ill.

[73] Assignee: Caterpillar Tractor Co., Peoria, Ill.

[21] Appl. No.: 153,009

[22] Filed: May 27, 1980

Related U.S. Application Data

[62] Division of Ser. No. 117,587, Nov. 5, 1979.

[51] Int. Cl.³ .............................................. F27B 7/00
[52] U.S. Cl. .................................. 432/103; 432/107; 432/105; 110/246
[58] Field of Search ...................... 110/245, 247, 246; 432/103, 105, 107, 117

[56] References Cited

U.S. PATENT DOCUMENTS

| | | | |
|---|---|---|---|
| 2,243,192 | 5/1941 | Clark | 432/117 |
| 2,402,436 | 6/1946 | Nichols | 110/247 |
| 3,487,793 | 1/1970 | Lerner et al. | 110/246 |
| 3,822,651 | 7/1974 | Harris et al. | 110/246 |
| 3,888,621 | 6/1975 | Williams | 432/103 |
| 3,938,450 | 2/1976 | Jaronko et al. | 110/246 |
| 4,014,106 | 3/1977 | Bearce | 432/107 |
| 4,055,390 | 10/1977 | Young | 432/105 |

Primary Examiner—Henry C. Yuen
Attorney, Agent, or Firm—Sixbey, Friedman & Leedom

[57] ABSTRACT

A method for preheating a rotatable fluidizable bed (106) comprises rotating the bed chamber (112) slowly to cause the particles (114) to slowly tumble and mix. During tumbling, one or more burners (150, 160) extending into the chamber (112), heat the particles (114) until the desired operating or ignition temperature is reached. Temperature sensors (170) in thermal communication with the bed particles (114) sense the temperature and provide either an indication thereof or an initiating signal which, in the case of a rotating fluidized bed combustor (10), terminates preheating, accelerates the bed chamber (112) rotation to normal combustor (10) operating speed and/or introduces fluidizing air and/or fuel flow through the bed chamber (112).

5 Claims, 2 Drawing Figures

METHOD AND APPARATUS FOR PREHEATING A ROTATABLE FLUIDIZABLE BED

This is a divisional of application Ser. No. 117,587, filed Nov. 5, 1979.

DESCRIPTION

TECHNICAL FIELD

The present invention relates to a method for preheating fluidized bed systems and, more particularly, to a rapid method for igniting rotating fluidized bed combustor systems.

BACKGROUND ART

In recent years fluidized beds have found many diverse uses in power generation systems and chemical processes. They have served as chemical reactors, particularly for finely divided materials; as incinerators for liquid, solid or gaseous substances; as pressurized or atmospheric, coal-, lignite-, petroleum-, peat-, wood- and/or paper-fired boiler or combustor units for power generation; and as sites for various process treatments such as drying, baking, coating, oxidizing, etc.

Typically, fluidized beds which are in use as combustor units are static beds established when air and a combustible fuel are introduced into a plenum chamber under pressure and forced upwardly through a diffusing medium (e.g., membrane, grate) to a superimposed chamber containing a particulate bed, of inert or reactive, finely divided, pulverulent solid material. The air, forced upwardly through the diffusing medium into the fluidizing chamber under a sufficient predetermined pressure, fluidizes the particulates. When the temperature within the bed is high enough to ignite the fuel-air reaction, combustion proceeds exothermically and, thus, the bed becomes self supporting.

In order to reach the combustion reaction ignition temperature, ordinary fluidized bed combustors must be preheated. This is particularly true of combustors employing solid fuels, such as powdered coal. Generally, in order to initiate combustion, the bed is first fluidized by passing air through it from the bottom (upstream side of the bed). A preheating flame is applied to the upper bed surface (downstream side of the bed) which, due to the considerable mixing action which occurs in any fluidized bed, heats up the entire bed. As the ignition temperature is reached the mixture of fuel and air begins to support an exothermic combustion reaction which is self sustaining, and the preheating flame is withdrawn. Although this combustor start-up technique is effective, it is extremely wasteful. This is because the fluidizing air passed through the bed during preheating is an effective coolant for the bed. Thus, the passage of air works at cross purposes with the preheating procedure. To be sure the cooling effect of the air can be avoided by preheating it prior to passing it into the bed. However, this requires additional equipment and additional energy and is inefficient for these reasons.

The present invention is directed to overcoming one or more of the problems as set forth above.

DISCLOSURE OF INVENTION

In one aspect of the present invention a method of preheating a fluidizable bed to an operating or ignition temperature at which an exothermic reaction can be self supporting is accomplished by rotating the bed slowly to tumble, without fluidizing, the particles therein and applying thermal energy to the bed to heat the bed particles to the desired temperature.

In another aspect of the invention the method involves slowly rotating the fluidized bed of a combustor while it is heated by means of one or more burners until the ignition temperature of the fuel-air combustion reaction is reached, at which point the speed of bed rotation is increased and a flow of fluidizing air is initiated through the bed.

In still another aspect of the invention, a rotating fluidized bed combustor includes means for preheating the bed particles to at least the ignition temperature for the exothermic combustion reaction.

In a particularly useful aspect of the invention, a rotating fluidized bed combustor includes burner means in the fluidization chamber in thermal communication with the bed particles to heat them to the combustion ignition temperature and temperature sensing means in thermal communication with the bed for providing an indication that the ignition temperature has been reached.

BEST MODE FOR CARRYING OUT THE INVENTION

The problem associated with preheating static fluidized beds may be overcome by employing rotating fluidized beds and utilizing rotation in lieu of fluidizing air flow to provide mixing during bed preheating to the desired operating or ignition temperature. The bed particles, which may consist of inert and/or a mixture of inert and reactive materials, are slowly tumbled by bed rotation at relatively low rotational speeds compared, for example, to the rotational speeds employed during normal combustor fluidized bed operation. In fact, it has been determined that slow tumbling of the dry bed particles provides an orderly and stable profile of bed surface or level which allows more efficient and effective placement and utilization of burners. As will become more apparent from a closer analysis of FIG. 2, the burners heat the bed particles as they tumble and are mixed due to bed rotation. When the desired bed temperature is reached, sensing means are utilized to provide an appropriate indication and/or to alter bed operating conditions, such as initiating increased rotational speed of and/or fluidizing air flow to the fluidizable bed. It has been determined that the rate of preheating is primarily dependent upon the number of burners and the amount of energy supplied thereto. Inasmuch as slow tumbling creates considerable particle agitation and stirring, there appears to be no advantage to using increased rotational speeds during preheating and the rate of preheating appears to be substantially insensitive to speed of bed rotation. A particularly important aspect of the present method is that preheating is accomplished in the complete absence of a fluidizing air flow. As a result the only significant energy consumed is thermal energy consumed by the burners, and no energy is wasted by the counterproductive chilling effect of a fluidizing air flow over the bed particles during preheating.

Figure 1:
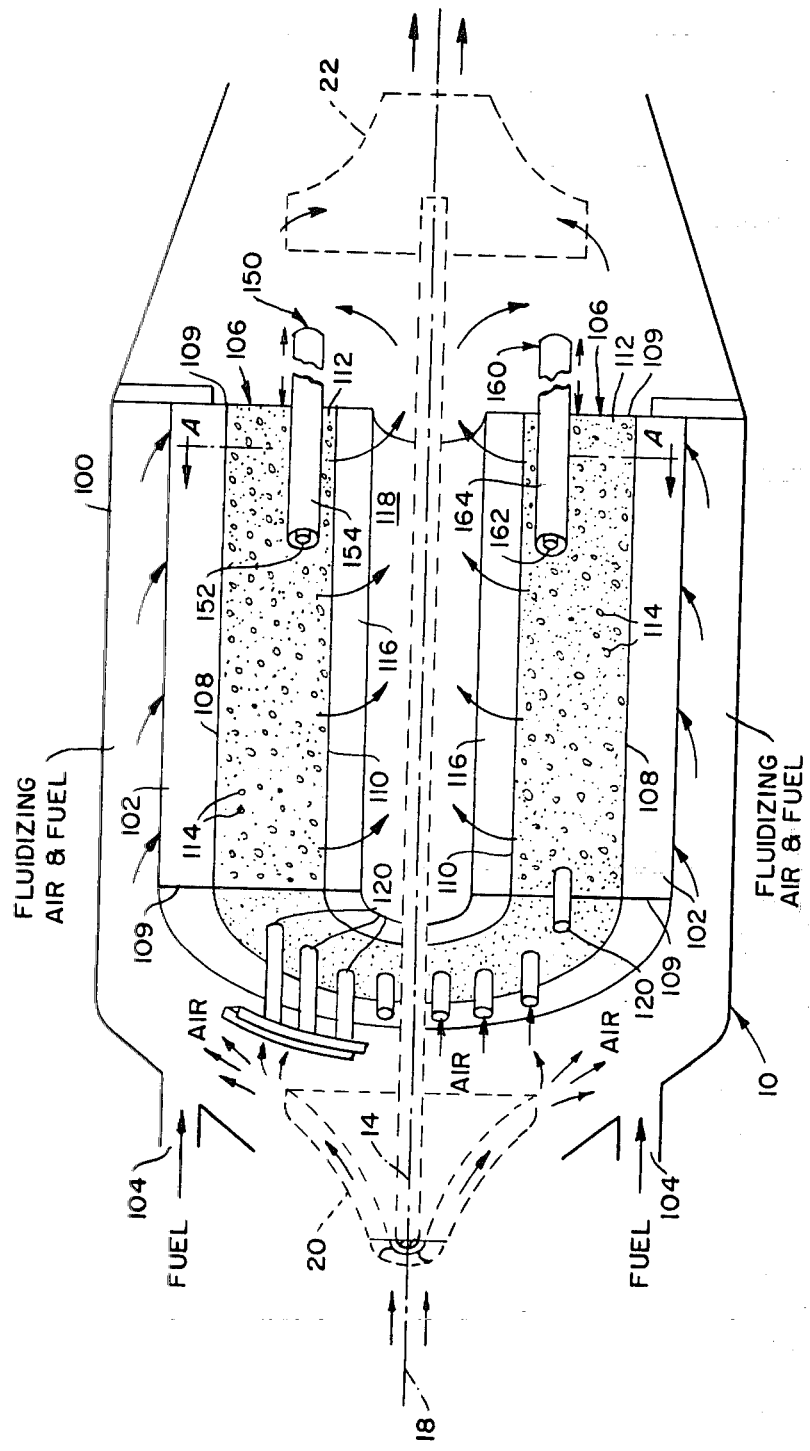
FIG. 1 is a schematically simplified sectional view of a typical rotating fluidized bed combustor system employed in the practice of the present invention.

A typical rotating fluidized bed combustor to which the present invention is applicable is illustrated in FIG. 1, together with exemplary compressor means 20 and expander means 22 of an otherwise conventional gas turbine engine shown in phantom. In some instances it may be desirable to integrally associate the compressor 20 and expander means 22 via a shaft assembly 14 (shown in phantom) to provide a means for driving the compressor. In such a case the rotating fluidized bed combustor 10 is advantageously mounted for rotation about the shaft assembly 14. As can be seen in detail the combustor 10 includes a housing 100 through which the rotatable shaft 14 may pass. Compressed air is ducted within housing 100 into inlet plenum chamber 102. The compressed air may be preheated air, such as exits the recuperator section of a gas turbine engine. Fuel fed through entry port 104 is mixed with the compressed air prior to entering the inlet plenum chamber 102 and is conveyed by the air to the fluidized rotating bed portion 106 of the combustor. In a preferred embodiment the fuel is powdered coal, desirably solvent refined coal to minimize ash removal problems. Alternatively, the fuel may be a liquid which can be suitably injected into the compressed air stream through port 104.

The rotating fluidized bed portion 106 comprises an outer perforated cylindrical wall 108, an inner perforated cylindrical wall 110 and appropriate enclosing walls 109 defining therebetween an annular fluidizing chamber 112 in which pulverulent solid particles 114 are disposed. The perforations in walls 108 and 110 are small enough to contain particles 114 within chamber 112 and to control the exhaust of solid combustion products but large enough to permit the entry of powdered fuel and to sustain the free flow of fluidizing air from the inlet plenum chamber 102 through wall 108, into and through chamber 112, through wall 110 and into outlet plenum chamber 116. The fluidized bed portion 106 rotates on horizontal, vertical or other appropriate axis, preferably about a longitudinal axis 18 which corresponds to the axis of coaxial cylindrical walls 108, 110. Rotation is motivated by available rotational means, such as appropriate gearing to drives, e.g. shaft assembly 14, for other conventional gas turbine engine functions. Rotation is controlled to a speed sufficient to impart a centrifugal force to the particles 114 within the bed. The centrifugal force causes the particles 114 to gravitate away from axis 18 toward outer perforated wall 108. The flow of fluidizing air from inlet plenum chamber 102 through perforated outer wall 108 opposes the centrifugally induced movement of the particles 114 and, in so doing, fluidizes the bed. Combustion occurs within the fluidizing chamber 112 between the fluidizing air and the fuel, e.g., powdered coal, to produce hot combustion gases within the bed. These hot combustion gases are swept out of the bed through inner perforated wall 110 by the continuing flow of fluidizing air through the bed. The unreacted fluidizing air and the hot combustion gases pass from outlet plenum chamber 116 into the core 118 of the combustor 26. In the embodiment illustrated in FIG. 1, where the combustor 10 is used in connection with a conventional gas turbine engine, core 118 is an elongated cylindrical chamber which directs the flow of unreacted fluidizing air and combustion gases through the vanes or blades of an expander, such as turbine means 22.

The bed particles 114 are preferably either inert materials, e.g., sand, etc. and/or a sulfur absorber, e.g., dolomite, etc. Alternatively, the bed particles may be any other inert material generally found suitable for use in fluidized beds. If desired, a portion of the fluidized bed may be solid fuel, such as powdered coal, admixed with inert materials, such as a particulate mixture of coal dolomite, sand and coal ash. A generally useful proportion of bed particles is 95% inert materials, 5% fuel. As the combustion proceeds, whether the fuel is a particulate component of the original bed or is carried into the bed with the fluidizing air, coal ash is formed and becomes either a part of the inert particulate portion of the bed or passes out of the bed through the inner perforated wall 110 with the unreacted fluidizing air and combustion gases. Any ash which passes out of the bed may be removed from the gas stream by a cyclone separator, not shown. Ash and sulfur remaining in the bed will eventually have to be circulated to a cleaning and reclaiming device, not shown. If solvent refined coal is used, ash and sulfur removal is generally not a problem since this type coal permits operation for lengthy periods without interruption.

The combustion temperature within the bed is controlled in part by the ratio of air to fuel fed into the bed. In addition, combustion temperature may be controlled by controlling the amount of heat transfer to cooling tubes (or coils) 120 which pass substantially longitudinally through the bed. The tubes 120 may, if desired, rotate with the bed portion 106 and are supplied with air from compressor 20 within housing 100. By pre-determining the rate of flow of air through the tubes and the number of tubes carrying air through the bed, localized temperatures within the bed are readily controlled. It is recommended to control the temperature of the bed to about 900° C. This minimizes volatilization of the ash constituent of the bed and prevents formation of "glassy" particles which can cause turbine blade erosion if they escape through the inner perforated wall of the fluidized bed. The heated air exhausting tubes 120 may, if desired, be directed into admixture with the unreacted fluidizing air and combustion gases from core 118 and directed through the vanes of turbine 22. In this manner, the temperature and flow volume of gases passing through turbine 22 can be controlled.

Figure 2:
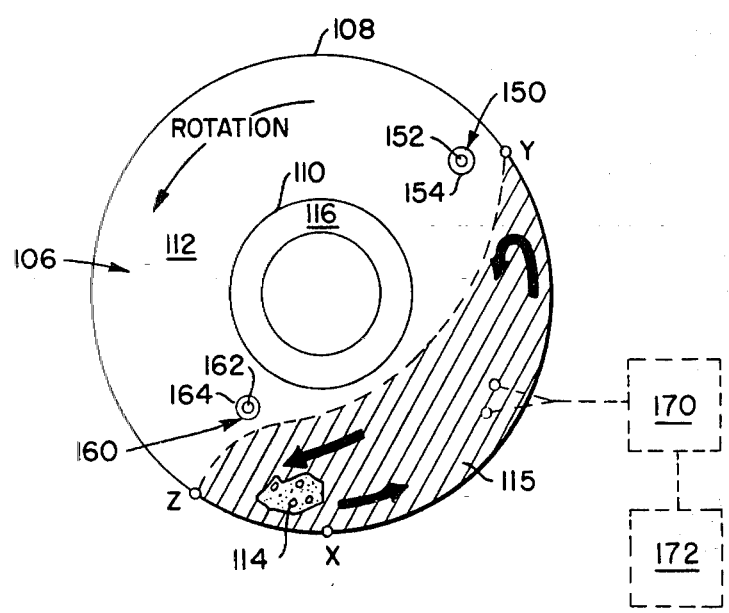
FIG. 2 is a sectional view taken substantially along line A—A in FIG. 1 illustrating an exemplary burner arrangement for preheating a rotatable fluidizable bed combustor system.

Preheating of the rotating fluidized bed combustor in accordance with the present invention is accomplished utilizing one or more preheating means, such as burners 150, 160 (two are shown in FIGS. 1 and 2) extending into chamber 112 to heat the particles 114 of the bed. Any suitable type burner may be used. However, such burners typically comprise an inner pipe 152, 162 through which is fed a gaseous fuel and primary combustion air and an outer pipe 154, 164 surrounding inner pipe 152, 162 to serve as a shield therefor against direct contact with bed particles 114. Secondary air can be supplied through the annular space defined between pipes 152, 162 and 154, 164. Typically, burners 150, 160 are supported in such a manner that they are slidable into and out of the fluidization chamber 112 and can be withdrawn completely therefrom if desired, such as once the rotating fluidized bed combustor becomes self sustaining. In alternative forms of the present invention, other preheating means, such as radiant energy, arc or resistor heating, and the like, disposed within or adjacent the tumbling bed particles may be used in lieu of conventional thermal burners.

Referring to FIG. 2, the preheating method of the present invention can be readily understood. As fluidized bed portion 106 is caused to rotate at a slow speed, the particles 114 slowly tumble within chamber 112 and an orderly circuit of particulate material around the cylindrical chamber 112 is established as indicated generally by the solid arrows which show an exemplary stirring of the particulate bed caused by counterclockwise rotation thereof. As the bed is stirred by the slow rotation of chamber 112, the particles are heated by burners 150, 160 which extend into the chamber. One preferred and efficient burner configuration within the chamber is shown in FIG. 2. As the bed rotates in a counterclockwise direction the particles 114 tend to cling to outer wall 108 and are carried upwardly from point "X" toward a maximum height at point "Y" whereupon the force of gravity causes the particles to tumble down to point "Z" where they cover the particles which are already dispersed along the lowermost periphery of wall 108. Sectioned portion 115 in FIG. 2 generally outlines the particle profile within the chamber during preheating. Burner 150 is disposed near point "Y" and somewhat radially inwardly from outer wall 108 in order that the burner flame will play upon and preheat the surface of the particles at about that point. Burner 160 is located near point "Z" and radially closer to inner wall 110 than is burner 150, to preheat the material which has slipped down from point "Y". The location of the burners is, obviously, a matter of preference and depends a great deal upon the nature and quantity of particles 114, the configuration and material of chamber 112 and the speed of bed rotation. It will be appreciated that considerable mixing of particles 114 takes place as they pass from points "Y" to "Z". Accordingly, preheating can be achieved, if desired, using only one appropriately located burner.

Industrial Applicability

The usefulness of a fluidized bed combustor in a conventional gas turbine engine is greatly enhanced by improving its efficiency and economy of operation. By utilizing a rotating fluidized bed combustor, the bed particles can be preheated to ignition temperature in an efficient and economical manner in the absence of a fluidizing air flow by using only the slow rotation of the fluidized bed portion to impart the needed stirring or mixing action to the particles during preheating.

Preheating of a rotating fluidized bed combustor 10 is accomplished by disposing at least one, and preferably two, burners 150, 160 within fluidization chamber 112 in which bed particles 114 are housed. The bed portion 106 is caused to rotate at a slow speed which in turn, causes slow tumbling and accompanying mixing of the particles 114. Energy is furnished to burners 150, 160 to heat the particles as they tumble. When the desired bed temperature is reached, such as the combustion ignition temperature, sensing means 170 (shown in phantom in FIG. 2) disposed in thermal communication with the bed particles are utilized to provide either an indication of this temperature condition or an initiating signal to a combustor operating control means 172 (shown in phantom in FIG. 2) which terminates preheating, accelerates the bed portion 106 to its normal combustion rotational speed and/or introduces fluidizing air and/or fuel through inlet plenum 102 and perforated wall 108. At this point, after preheating is terminated, the burners 150, 160 may be withdrawn from chamber 112 if desired, and the combustor 10 is self sustaining. Exemplary temperature sensing means include thermocouple sensors in contact with particles 114, optical pyrometers, and the like.

The same preheating process of the present invention may be used even if the combustor is of the liquid fired rotating fluidized bed type. Likewise, should a gas fueled combustor or combustor-reactor combination require preheating of the rotating fluidized bed the method of the present invention would be equally applicable. One particularly useful application for the present method is in connection with combination rotating fluidized bed combustor-heat exchangers to preheat the combustor rotating fluidized bed.

Other aspects, objects and advantages of this invention can be obtained from a study of the drawings, the disclosure and the appended claims.

I claim:

1. A method for preheating a rotating fluidized bed combustor to the ignition temperature of the exothermic combustion reaction desired to occur therein, said combustor including an elongated fluidization chamber having a longitudinally extending axis and a perforated peripheral wall, a bed of pulverulent solid particles in said chamber, heating means in thermal communication with said bed, means for rotating said chamber about said axis to cause the particles to centrifugally gravitate toward said perforated peripheral wall and means for selectively initiating a flow of combustible fuel in a gaseous agent stream into said chamber through said peripheral perforated wall, said gaseous agent stream fluidizing said bed particles and said fuel reacting with said gaseous agent in said chamber, said method comprising the steps of:
    (a) slowly rotating said chamber at a speed sufficient to cause tumbling and mixing of said bed particles but insufficient to cause centrifugal gravitation toward said peripheral wall prior to initiating the flow of said gaseous agent stream; and
    (b) applying thermal energy to said tumbling particles to heat said particles to said ignition temperature.

2. A method, as claimed in claim 1, including the steps of sensing the temperature of said particles in said bed and adjusting said combustor operating conditions when said ignition temperature is reached.

3. A method, as claimed in claim 2, wherein said adjusting step includes initiating the flow of said gaseous agent stream and increasing chamber rotational speed to a speed sufficient to cause centrifugal gravitation of said bed particles toward said peripheral wall.

4. A method, as claimed in claims 1, 2 or 3, wherein said combustible fuel is particulate coal and said gaseous agent is air.

5. A method, as claimed in claims 1, 2 or 3, including the step of withdrawing said heating means from thermal communication with said bed when said exothermic reaction becomes self sustaining.

* * * * *